United States Patent
Weiss

(10) Patent No.: US 6,267,387 B1
(45) Date of Patent: Jul. 31, 2001

(54) WHEEL SUSPENSION WITH AUTOMATIC CAMBER ADJUSTMENT

(76) Inventor: Wolfgang Weiss, Daimlerstrasse 15, Ottobrunn (DE), D-85521

(*) Notice: Subject to any disclaimer, the term of this patent is extended or adjusted under 35 U.S.C. 154(b) by 0 days.

(21) Appl. No.: 09/254,744
(22) PCT Filed: Sep. 12, 1997
(86) PCT No.: PCT/EP97/05008
§ 371 Date: Mar. 11, 1999
§ 102(e) Date: Mar. 11, 1999
(87) PCT Pub. No.: WO98/10949
PCT Pub. Date: Mar. 19, 1998

(30) Foreign Application Priority Data

Sep. 12, 1996 (DE) .............................................. 196 37 159

(51) Int. Cl.[7] .............................. B60G 17/01; B60G 7/99; B60G 21/05
(52) U.S. Cl. ................................ 280/5.52; 280/86.751; 280/124.106
(58) Field of Search ............................... 280/5.52, 5.521, 280/86.75, 86.751, 86.758, 124.103, 104, 5.507, 509, 124.106

(56) References Cited

U.S. PATENT DOCUMENTS

| | | | |
|---|---|---|---|
| 2,678,830 | * | 5/1954 | Cigan et al. ........................ 280/124 |
| 2,907,578 | * | 10/1959 | Taber .................................... 280/112 |
| 3,711,113 | * | 1/1973 | Stammreich ...................... 280/96.2 R |
| 4,546,997 | * | 10/1985 | Smyers .................................. 280/772 |
| 4,700,972 | | 10/1987 | Young . |
| 5,284,353 | * | 2/1994 | Shinji et al. .......................... 280/660 |
| 5,324,056 | * | 6/1994 | Orton ................................. 280/112.1 |

FOREIGN PATENT DOCUMENTS

| | | |
|---|---|---|
| 41 13 736 A1 | 10/1991 | (DE) . |
| 0 378 028 A1 | 7/1990 | (EP) . |
| 0 378 028 B1 | 1/1993 | (EP) . |
| 1 526 970 | 10/1978 | (GB) . |
| 2 243 349 A | 10/1991 | (GB) . |

OTHER PUBLICATIONS

Hamy, Norbert, "The Trebron DRC Racing Chassis", *Motor*, Dec. 21, 1968, pp. 20–24.

* cited by examiner

Primary Examiner—Anne Marie Boehler
Assistant Examiner—Tony Winner
(74) Attorney, Agent, or Firm—Townsend and Townsend and Crew LLP

(57) ABSTRACT

An independent suspension system for vehicles including wheel uprights which move in different directions relative to the chassis when negotiating curves. The system automatically adjusts the wheel camber based on the forces effective on the vehicle when negotiating curves. The relative movement with respect to the chassis of the parts of the wheel suspension having mutually different movements when negotiating curves is registered, and the wheel camber angle and/or the steering angle of the wheels is controlled with the aid of actuators.

13 Claims, 11 Drawing Sheets

WHEEL SUSPENSION WITH AUTOMATIC CAMBER ADJUSTMENT

BACKGROUND OF THE INVENTION

The invention relates to an independent suspension system for vehicles including wheel uprights which move in differing directions relative to the chassis when negotiating curves. The system automatically adjusts the wheel camber based on the forces effective on the vehicle when negotiating curves. Means are provided for registering the relative movement with respect to the chassis of the parts of the wheel suspension having mutually different movements when negotiating curves and for controlling the wheel camber angle and/or the steering angle of the wheels with the aid of actuating means.

In the case of vehicles having independent suspension systems, it is impossible to avoid changes in suspension geometry when negotiating curves (rolling movement of the chassis) or in the event of jounce and heave of the chassis (up and down movement of the vehicle).

The wheel camber angle is particularly adversely affected when negotiating curves. Inappropriate wheel camber angles have a negative effect on the driving characteristics of the vehicle, i.e. in the case of an optimally adjusted wheel camber for driving in a straight line, the driving characteristics, e.g. safety and speed, will suffer due to the above-mentioned changes in the geometry, since the maximum possible surface contact of the tires cannot be achieved or the maximum possible cornering force is not reached.

In the past, various attempts have been made to overcome the effects of the rolling movement of the chassis upon the wheel camber.

In order to get around the above-mentioned disadvantages when negotiating curves, it has been proposed for example that the wheel camber be set in a negative range for straight line driving, this then producing improved driving conditions or improved settings of the wheel camber when negotiating curves.

Here, however, it is disadvantageous that the tire will heat up very unevenly across the tire width when driving in a straight line due to the surface of the tire being raised at one side, thereby reducing the driving characteristics i.e. the maximum cornering force transmissible by the tire, especially in curves.

Furthermore, attempts have been made to reduce the above-mentioned disadvantages by means of special configurations of the suspension arms. For example, changes of wheel camber when the chassis is rolling are counteracted by means of non-parallel, unequally long suspension arms. Here, however, the virtually unavoidable alteration in the wheel camber during jounce and heave of the chassis has a disadvantageous effect upon the driving characteristics.

This solution can thus only be considered as being an unsatisfactory compromise.

It was proposed in the publication "Design of racing sports cars" by Colin Cambell, published by Chapman & Hall Ltd., London EC4P 4EE in 1973, that the wheel camber be adjusted or optimized in accordance with the rolling movement of the chassis or the effects of centrifugal force, this being referred to as "Trebron DRC" (double roll center suspension).

In this design, it is necessary to provide a sub-chassis which is pivotal about a center point located above the center of gravity of the vehicle with the aid of curved grooves on guide pins fixed to the chassis. The spring/damping elements and also the lower suspension arms engage this sub-chassis. The upper suspension arms are coupled via levers which, for their part, are pivotal about the guide pins at the chassis end of the arrangement. The sub-chassis is operatively coupled to the pivoted lever by means of a bearing pin.

One substantial disadvantage here is the space needed for the sub-chassis which makes it impossible to install or, at least, considerably increases the difficulty of installing certain parts of the vehicle or the engine/transmission, etc. The relatively large number of mechanical parts (sliding link guides, etc.), which are problematic as regards absence of play and accessibility, also stand in the way of the wanted precision in the control function.

SUMMARY OF THE INVENTION

In accordance with the invention, provision is made, for example, that hydraulic master cylinders be arranged between the chassis and the oscillating or swinging wheel uprights or suspension elements (suspension arms), the working spaces of these cylinders being mutually cross-coupled and the cylinders controlling slave cylinders on the upper suspension arms thereby producing a compensating effect for any alteration in the wheel camber in dependence on the rolling movement of the chassis.

DESCRIPTION OF THE PREFERRED EMBODIMENTS

The illustrations of FIGS. 1, 2, 4, 5, 6, 7, 9 and 10 show a schematic view of a rear wheel suspension as seen from the rear. For the sake of clarity, the spring elements and the damping elements have been dispensed with since these are known to the skilled person from the state of the art and are not of prime relevance to the invention.

In addition, the configuration of the chassis/suspension arms/wheel uprights, using equally long, parallel suspension arms, is only given by way of example in the Figures and it should be understood that this does not in any way limit on the invention. In the case of an implementation of this configuration—equally long, parallel suspension arms—in accordance with the invention, the advantages (no alteration of the wheel camber during jounce and heave) can be utilized without the disadvantages (alteration of the wheel camber when negotiating curves, etc.) that usually arise. It is readily apparent to the skilled person that the invention is, in principle, applicable to any of the known independent suspension systems incorporating wheel uprights moving in differing directions when negotiating curves.

Naturally, the invention is also applicable in like manner to steerable axles whereby, if necessary, the track rods usually engaging the upper reaches of the wheel uprights have to be placed in the plane of the lower suspension arms and these track rods should be of the same length as the lower suspension arms or must comprise balancing elements corresponding thereto (not illustrated).

The hydraulic elements (master cylinders, working or servo cylinders) are illustrated schematically as regards their implementation and mounting arrangements. It is not absolutely essential that the master cylinders be arranged, as illustrated, directly between the chassis and an oscillating part of the wheel suspension. Rather, the relative movement between the chassis and the oscillating part of the wheel suspension may, for example, be conveyed to the master cylinder indirectly via push or pull rods and bell cranks, thereby opening up further advantageous ways of implementing the system as regards the spatial arrangement of the master cylinders and possibly incorporating a progressive/degressive transfer function in the control characteristic.

Either/flexible hoses or, preferably, rigid tubing may be employed in the hydraulic pipeline system, whereby flexible hoses that are preferably as short as possible are provided at the relevant moving transition points in the case of the rigid tubing. However, to improve the clarity of this disclosure of the invention, these items are not shown in the illustrations. The master cylinders and servo cylinders as well as the various check valves and possible flow restrictors may, in a particularly advantageous manner, be gathered together in the form of a block whereby connections between the pipes can be dispensed with to the greatest possible extent (not illustrated).

Figure 1:
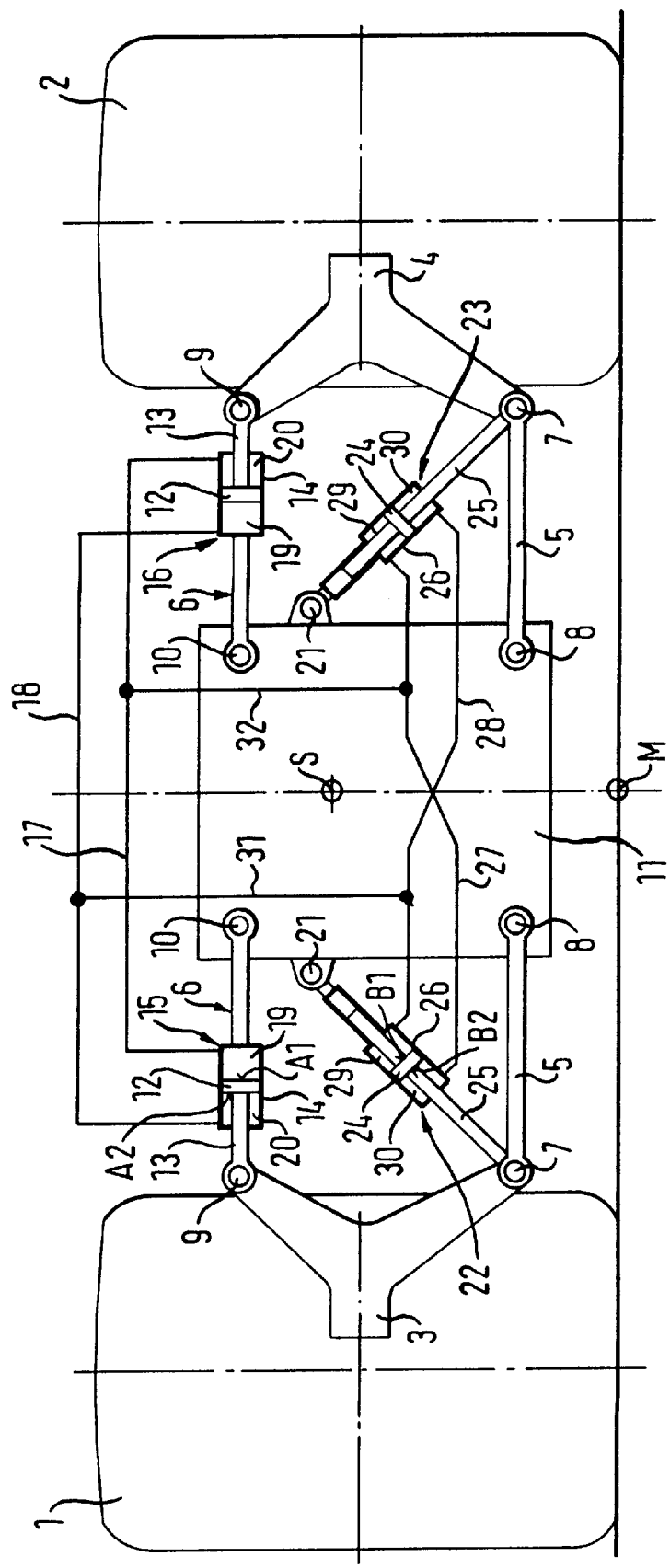
FIG. 1 shows a schematic view of a wheel suspension for a vehicle as seen from the rear when at rest or in a neutral straight line driving situation and including a control device made in accordance with the invention.

FIG. 1 shows two virtually indicated wheels 1, 2 which are connected to the chassis 11 via wheel uprights 3, 4, upper and lower transverse suspension arms 5, 6 and via the corresponding articulation points 7, 8, 9 and 10. The upper transverse suspension arms 6 are constructed in two parts in a manner such that the first part comprises a piston rod 13 supporting a piston 12 and the second part comprises a cylinder 14 accommodating the piston. In other words, the upper transverse suspension arms 6 are made variable in length by means of the respective double-action hydraulic cylinders or servo cylinders 15, 16. The servo cylinders 15, 16 are coupled to the pipelines 17, 18 in a manner such that the chamber 19 on the chassis side of the servo cylinder 15 is coupled to the chamber 20 on the wheel upright side of the servo cylinder 16. The chamber 19 on the chassis side of the servo cylinder 16 is coupled to the chamber 20 on the wheel upright side of the servo cylinder 15 in similar manner.

The surface area (A1) of the piston in the chassis-end chamber 19 is, for example, greater than the surface area (A2) of the piston in the chamber 20 on the wheel upright side. Thus, when considered independently, this is a fundamentally rigid system, i.e. the upper transverse suspension arms 6 are primarily of unalterable length since the pistons 12 are blocked in their cylinders 14 by virtue of the above-mentioned condition (A1/A2 not equal to 1).

Double-action hydraulic cylinders serving as master cylinders 22, 23 are arranged between the chassis-end articulation points 21 on the one hand, and between the wheel/upright-end articulation points 7 on the other, in a manner such that the piston rods 25 supporting the pistons 24 are, for example, connected to the wheel-upright-end articulation points 7 and the cylinders 26 are connected to the chassis-end articulation points 21.

The positions of the articulation points for the master cylinders 22, 23 are chosen so that a relative movement takes place therebetween when the springs of the chassis 11 are deflected and rebound. The chambers of the master cylinders 22, 23 are connected diagonally by the fluid lines 27, 28, i.e. the chassis-end chambers 29 at one side of the arrangement are connected to the wheel upright-end chambers 30 at the other.

The surface areas (B1, B2) of the pistons in each of the chambers 29, 30 are of equal size in the case of the master cylinders 22, 23, i.e. when viewed independently, the master cylinders form a moveable system allowing the springs to be deflected and to rebound. In other words, the pistons 24 can move in synchronism in their cylinders 26 by virtue of the condition B1/B2=1.

The interconnecting fluid lines 27, 28 of the master cylinders 22, 23 (the moveable system) are connected to the interconnecting fluid lines 17, 18 of the servo cylinders 15, 16 (the rigid system) by means of the fluid lines 31, 32 in such manner that, when negotiating a curve for example, the resultant rolling movement of the chassis 11 about the instantaneous center M, i.e. the volume displacement in the master cylinders 22, 23 caused by the deflection of the wheel 1 on the outside of the curve and the rebound of the wheel 2 on the inside of the curve, is effective on the situation of the volumes in the cylinder chambers 19, 20 of the servo cylinders 15, 16 so that the length of the upper transverse suspension arm 6 alters in the opposite sense.

Figure 2:
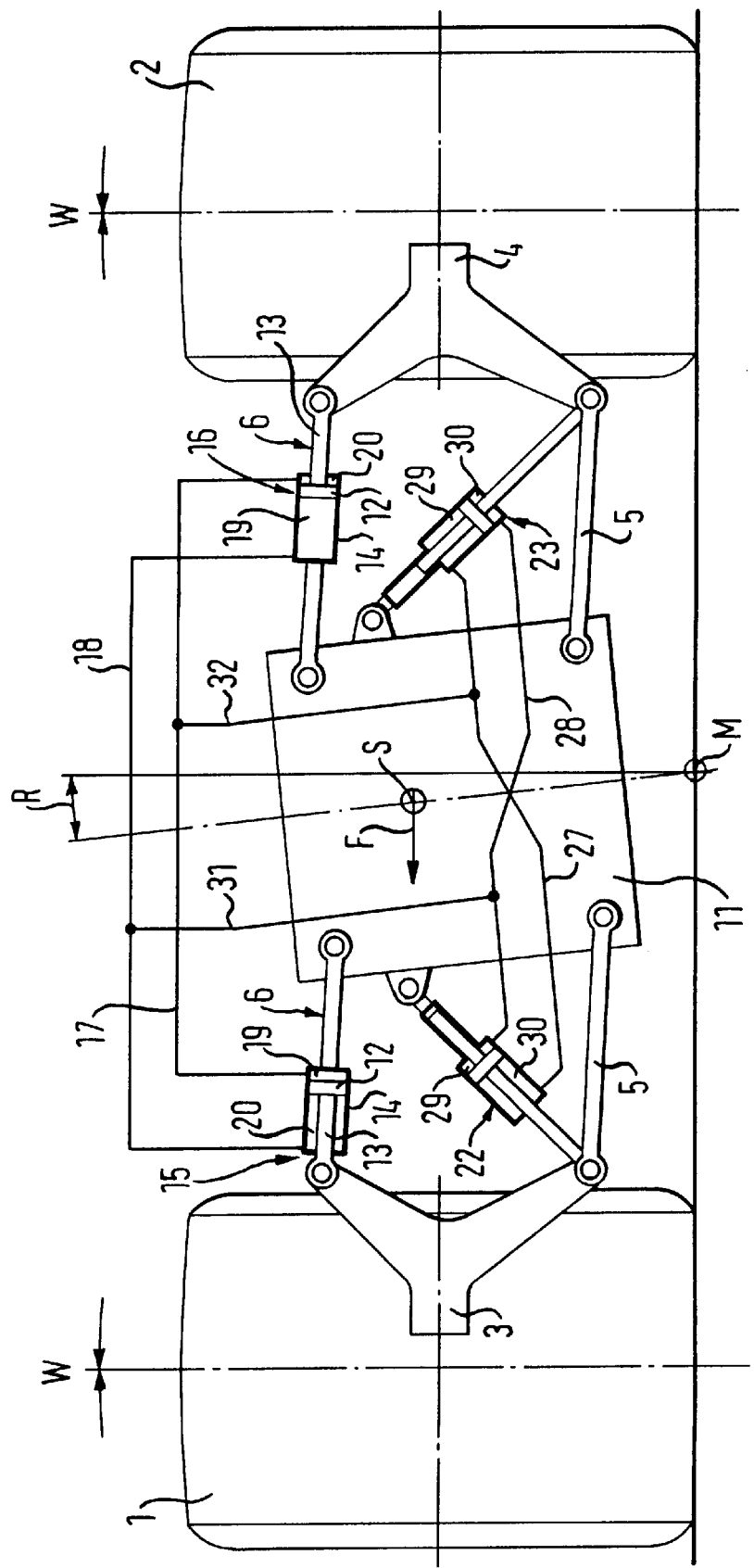
FIG. 2 is a schematic view of the wheel suspension of FIG. 1 when negotiating a curve (right-hand bend)

FIG. 2 shows the vehicle of FIG. 1 in a right-hand curve, i.e. the chassis 11 has tilted about the roll center M due to the centrifugal force F acting on the center of gravity S. As is discernible from FIG. 2, the volume from the chamber 29 of the master cylinder 22 and the volume of the chamber 30 of the master cylinder 23 have been transferred into the chamber 20 of the servo cylinder 15 and the chamber 19 of the servo cylinder 16. The volumes were transferred perforce from the chamber 19 of the servo cylinder 15 and from the chamber 20 of the servo cylinder 16 into the chambers 30, 29 of the master cylinders 22, 23.

The change in length of the upper transverse suspension arm resulting therefrom causes a correction to be made in the camber of the wheels 1, 2, i.e. in this example, the wheel camber angle W (FIG. 2) remains at zero degrees despite the rolling movement (angle R in FIG. 2) of the chassis 11.

However, in the event that this should prove advantageous, other adjustments in regard to the wheel camber could be made by appropriate design of the master cylinders and servo cylinders or by varying the position of the articulation points for the master cylinders.

It also falls within the framework of the invention to execute the adjustment of the wheel upright by the servo cylinders not just in a vertical plane (purely a wheel camber adjustment) but rather, an adjustment may also be made in a range varying from the vertical plane right down to the horizontal plane, i.e. appropriate adjusting elements may also be made use of in the track rods for optimizing the steering geometry.

Figure 4:
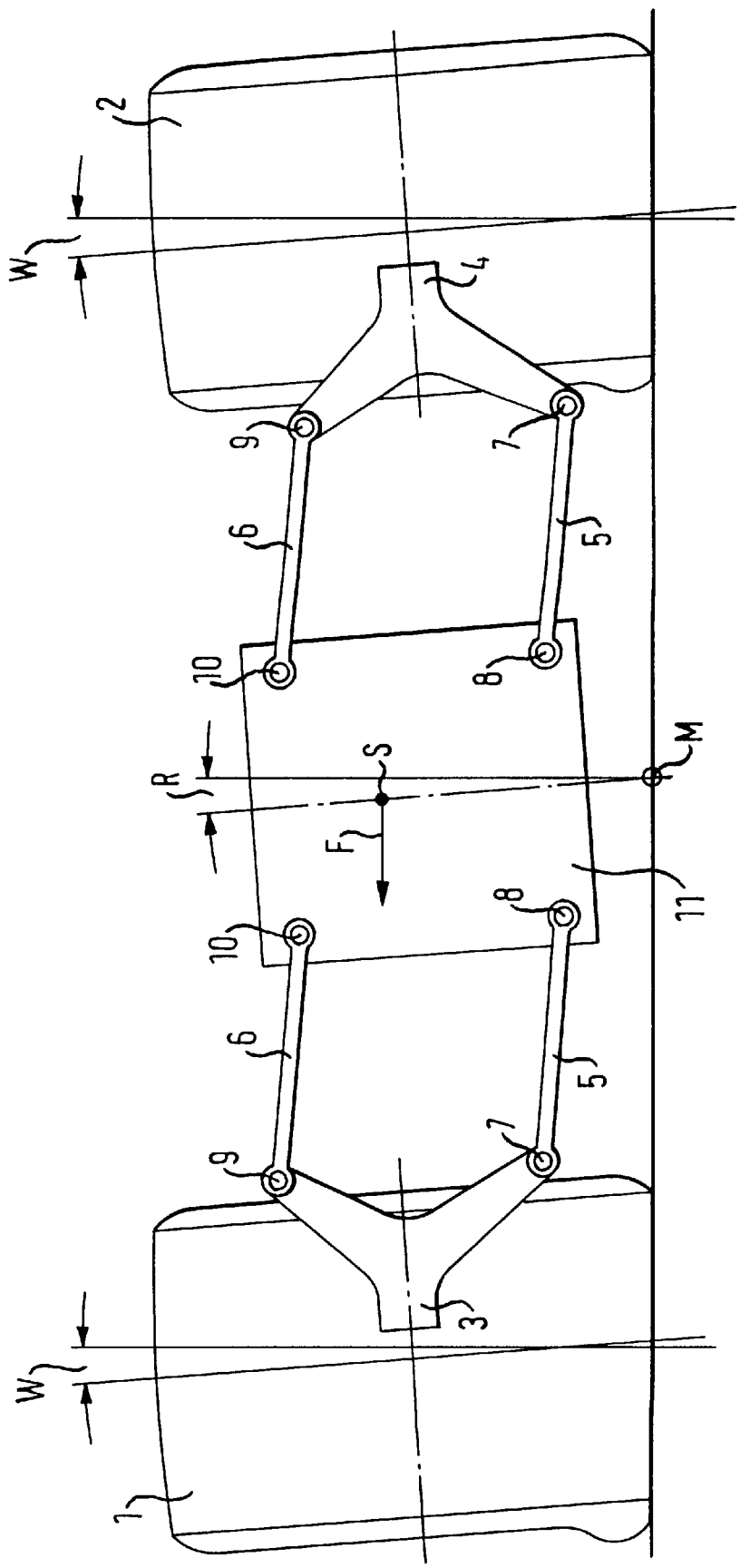
FIG. 4 is a schematic view of a wheel suspension in a driving situation in accordance with FIG. 2 but without the device in accordance with the invention.

As a comparison thereto, FIG. 4 shows the same situation as in FIG. 2 (roll angle R) but a device in accordance with the invention is not provided in this case. One can clearly see the alteration in camber of the two wheels 1, 2 (angle W), this thereby having a disadvantageous effect upon the accommodation of transverse forces due to the unfavorable amount of tire contact at the outside of the curve, i.e. that of the main supporting wheel. This is counteracted in practice by virtue of a preset negative wheel camber and a special link configuration of unequal, non-parallel suspension arms although in this case, during straight-line travel, a non-uniform temperature profile can be produced across the width of the tire i.e. overheating can occur at certain points thereby promoting tire wear. The "cold areas" of the tire cannot attain their maximum adhesion values. Changes in the wheel camber that occur during jounce and heave cannot be avoided by the link arrangement in accordance with the state of the art.

Figure 3:
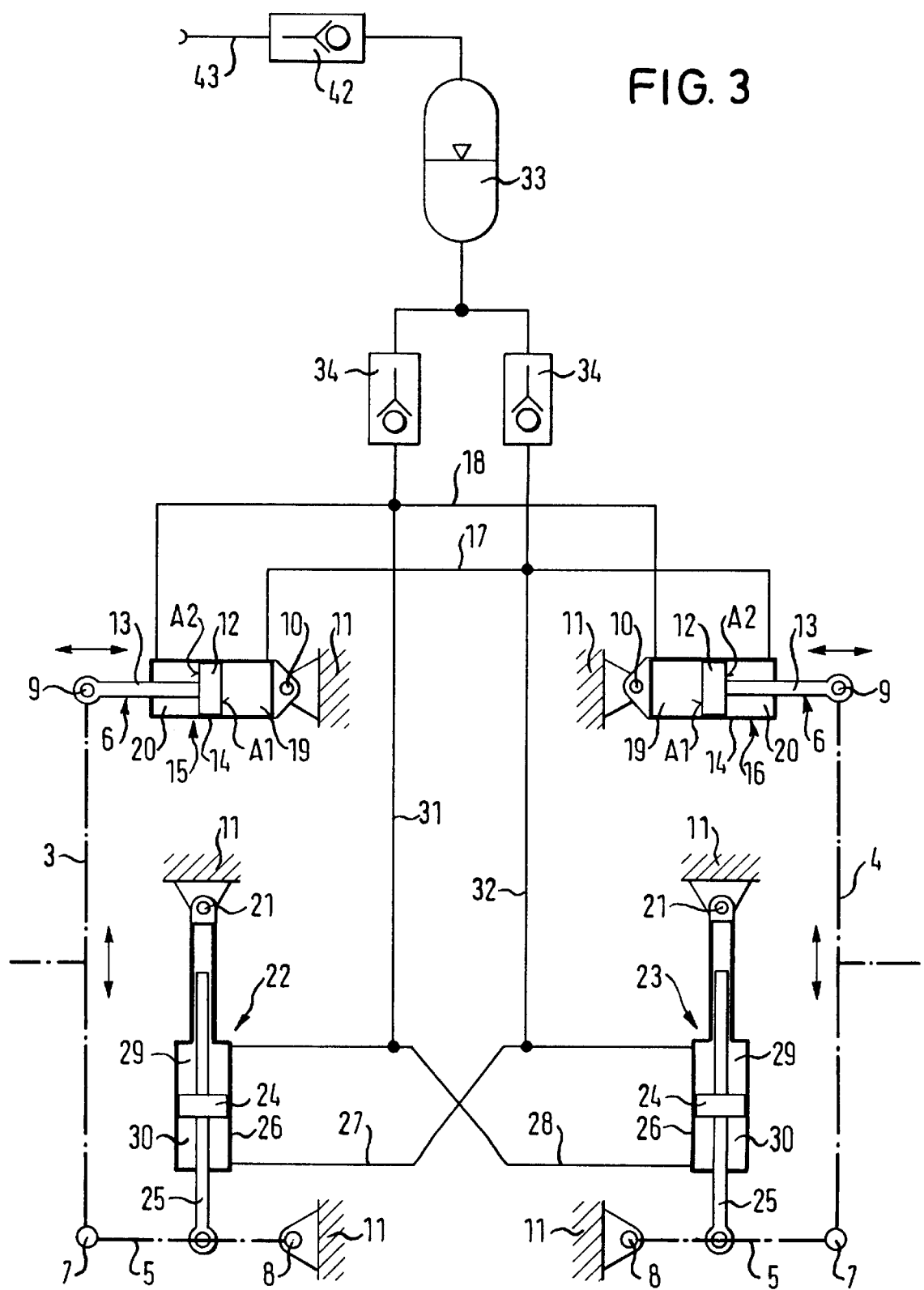
FIG. 3 is a schematic connection diagram of the hydraulic system in the control device in accordance with the invention shown in FIGS. 1 and 2.

The preferably hydraulic arrangement in accordance with the invention provided in FIGS. 1 and 2 is reproduced in FIG. 3 in the form of a schematic connection diagram. Similar parts are provided with the same references.

The whole hydraulic system is brought up to an enhanced basic pressure by means of a pressure accumulator 33 in order to minimize any imprecision in or delays to the adjustment process due to unwanted changes in volume in the fluid line system. The pressure accumulator 33 is connected to the fluid lines 31, 32 via the check valves 34. In essence, the pressure accumulator 33 is formed by two chambers separated by a membrane or a piston, so that gas pressure builds up in one chamber via a supply line 43 incorporating a check valve 42, and the other chamber is connected to the hydraulic system. A suitable (not illustrated) hydraulic pump and accumulator may be provided instead of the pressure accumulator described above. This device described in conjunction with FIGS. 1, 2 and 3 is also made use of for increasing the basic pressure in the other examples being presented (FIGS. 5 to 11).

Figure 5:
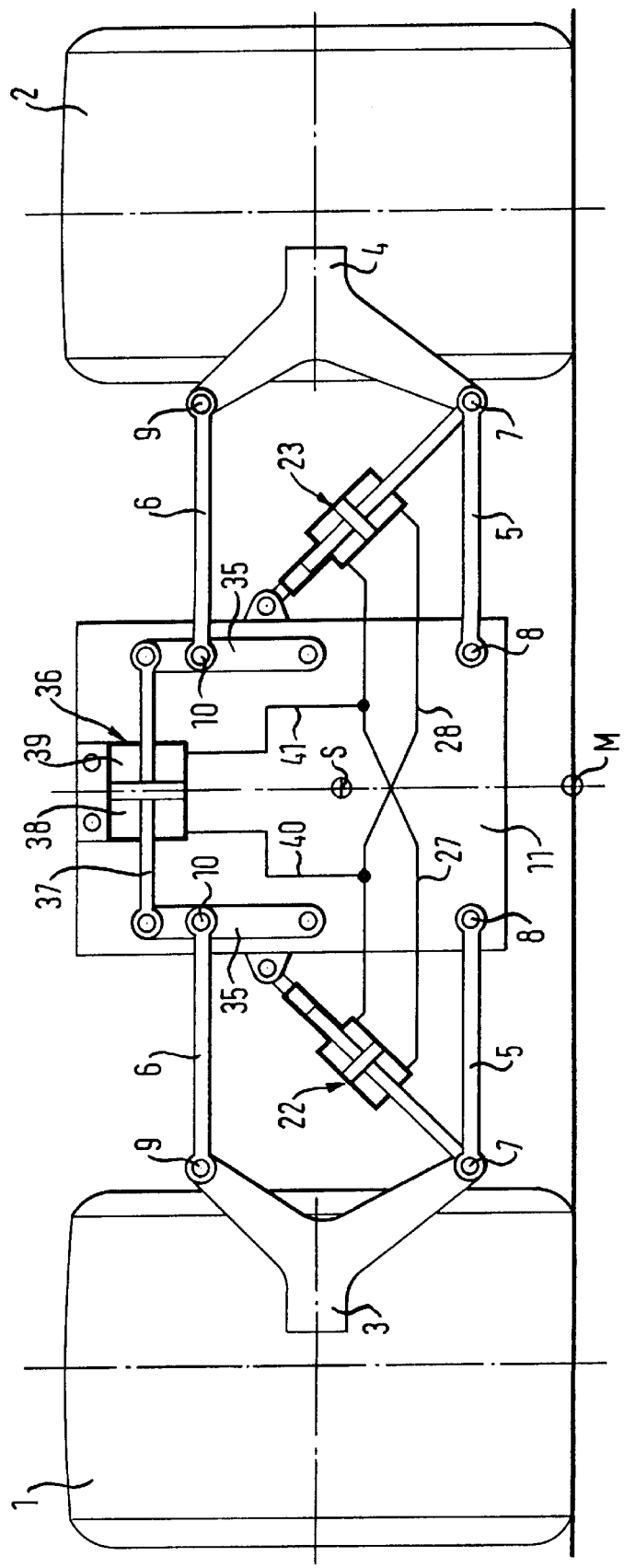
FIG. 5 shows a wheel suspension including another embodiment of a control device in accordance with the invention in an illustration corresponding to FIG. 1.
Figure 6:
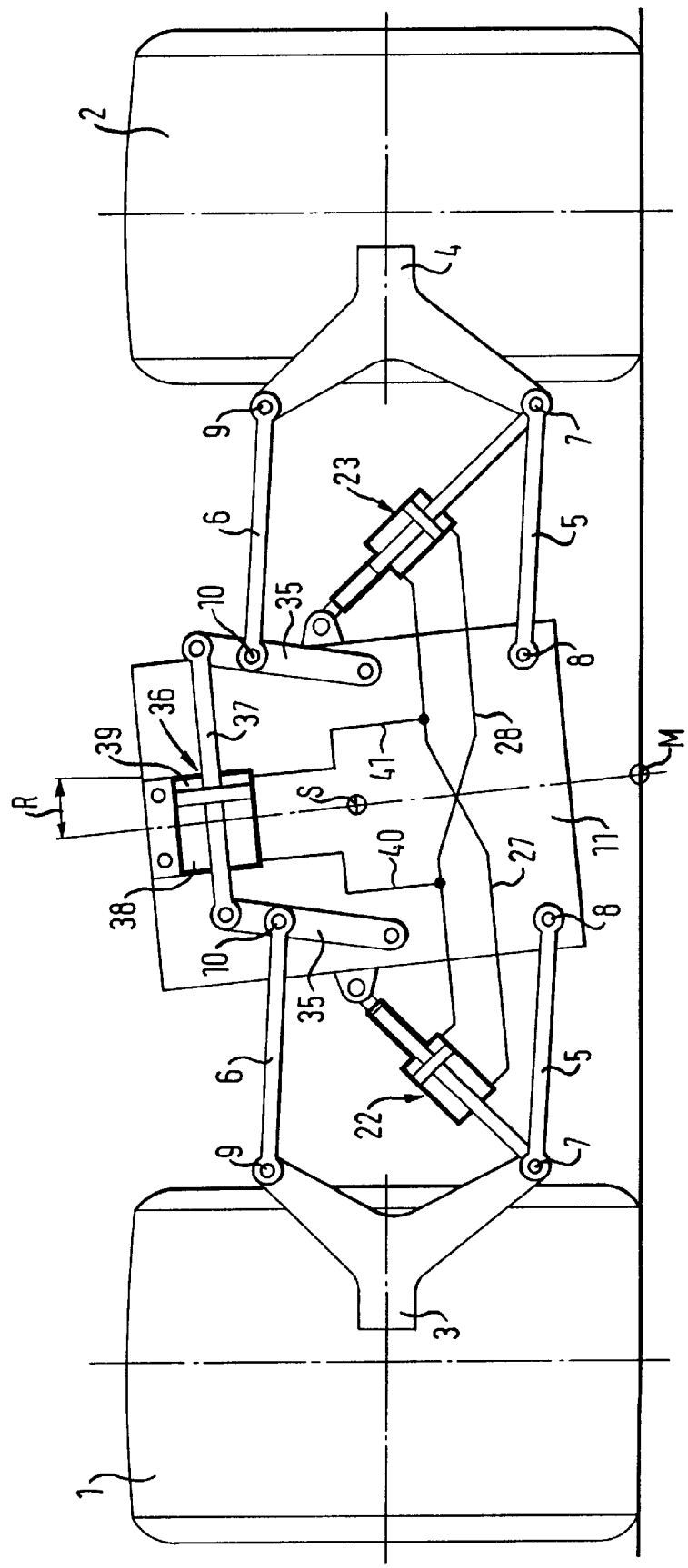
FIG. 6 shows the embodiment of FIG. 5 in a driving situation in accordance with FIG. 2.

FIGS. 5 and 6 show another embodiment of the invention in the form of an illustration similar to that of FIGS. 1 and 2. Similar parts therein are provided with the same references. However, in FIGS. 4 and 5, in contrast to FIGS. 1 and 2, the chassis-end articulation point 10 of the upper transverse suspension arms 6, which are formed by fixed length components here, is attached to the chassis 11 in moveable manner by means of a bell-crank 35. The upper transverse suspension arms 6 are subjected to the effect of a double-action hydraulic piston/cylinder arrangement 36 (servo cylinder) fixed to the chassis 11, namely/by virtue of its common piston rod 37. The two chambers 38, 39 of the servo cylinder 36 are connected to the master cylinder system (22, 23) via the fluid lines 40, 41.

As is depicted in FIG. 6, when the chassis 11 is rolling, the piston rod 37 of the servo cylinder 36 is displaced, i.e. the chassis-end suspension points 10 of the upper transverse suspension arms 6 are shifted via the bell-crank 35 thus leading to a correction of the wheel camber. Due to the lever arrangement 35, various transfer ratios can be realized by shifting the position of the articulation points, as can various properties of the adjustment (linear, progressive, degressive) be realized by using an appropriate configuration of the levers.

Figure 7:
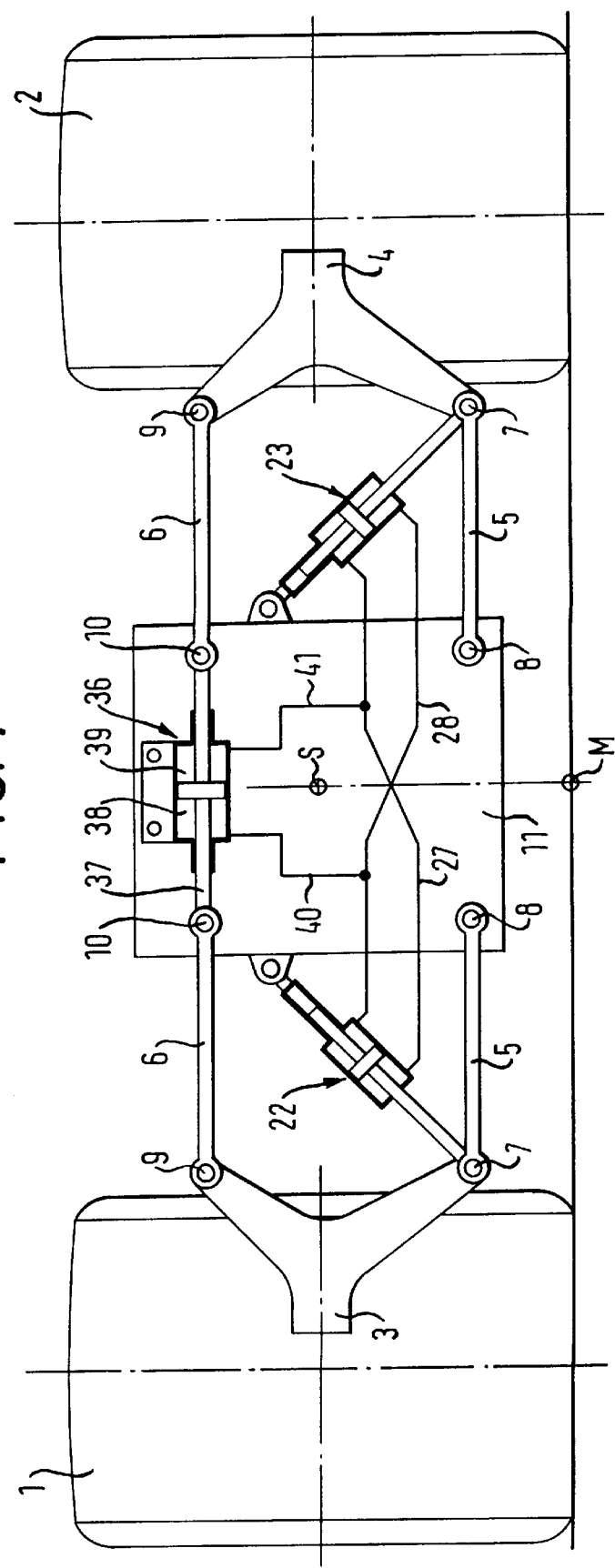
FIG. 7 shows a wheel suspension including a control device in accordance with the invention in a further embodiment which is modified vis a vis FIG. 5.

A variant of this embodiment, simplified vis a vis FIGS. 5 and 6 by dispensing with the bell-crank 35, is illustrated in FIG. 7. The piston rod 37 is effective directly on the suspension point 10 or co/operates via not-illustrated coupling rods with the articulation points 9.

Figure 8:
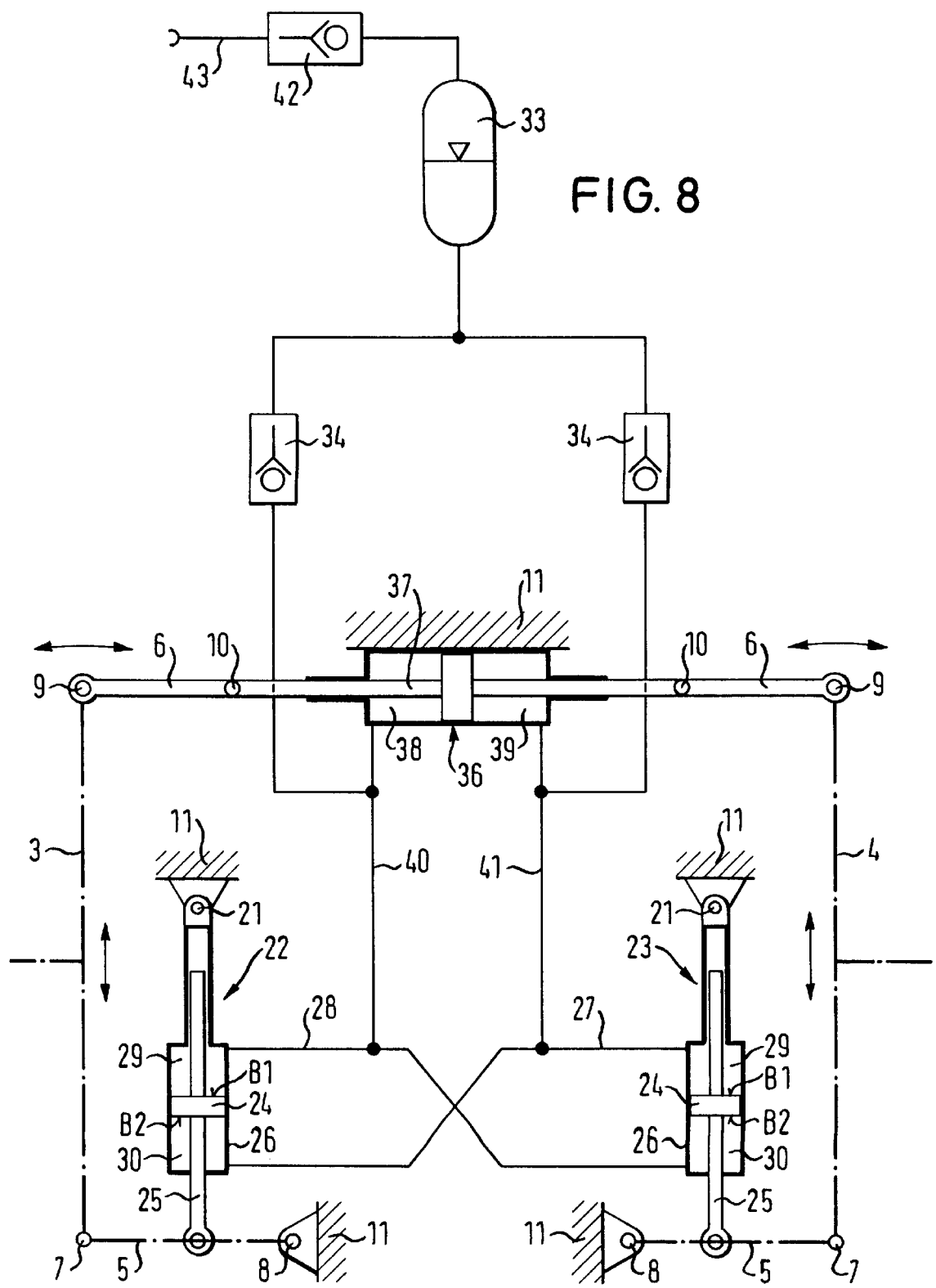
FIG. 8 is a schematic connection diagram of the hydraulic system in the control device in accordance with the invention shown in FIGS. 5 to 7.

The preferably hydraulic arrangement provided in accordance with the invention in FIGS. 5, 6 and 7 is reproduced in FIG. 8 in the form of a schematic connection diagram. Similar parts are provided with the same references.

Figure 9:
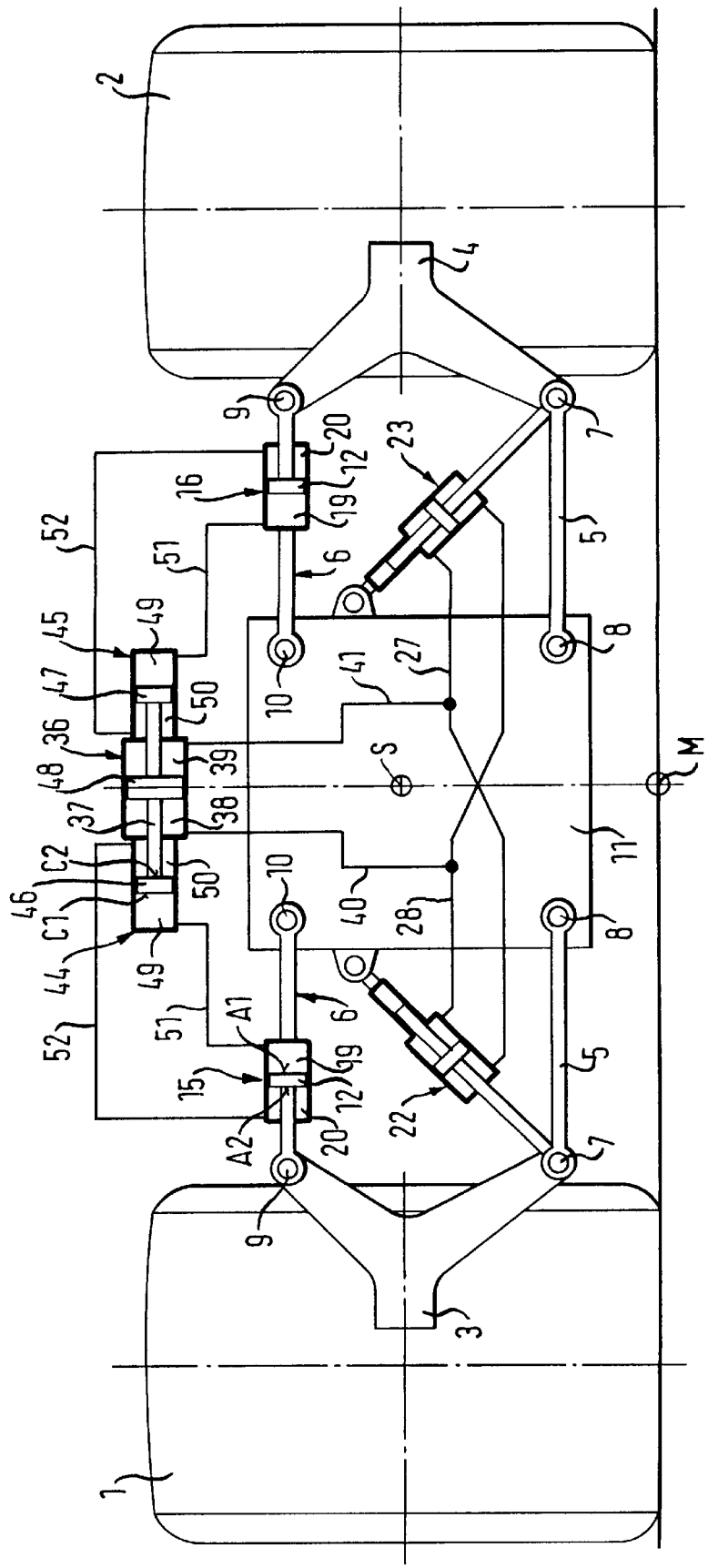
FIG. 9 shows a wheel suspension including a particularly preferred embodiment of a control device in accordance with the invention in an illustration corresponding to FIG. 1.
Figure 10:
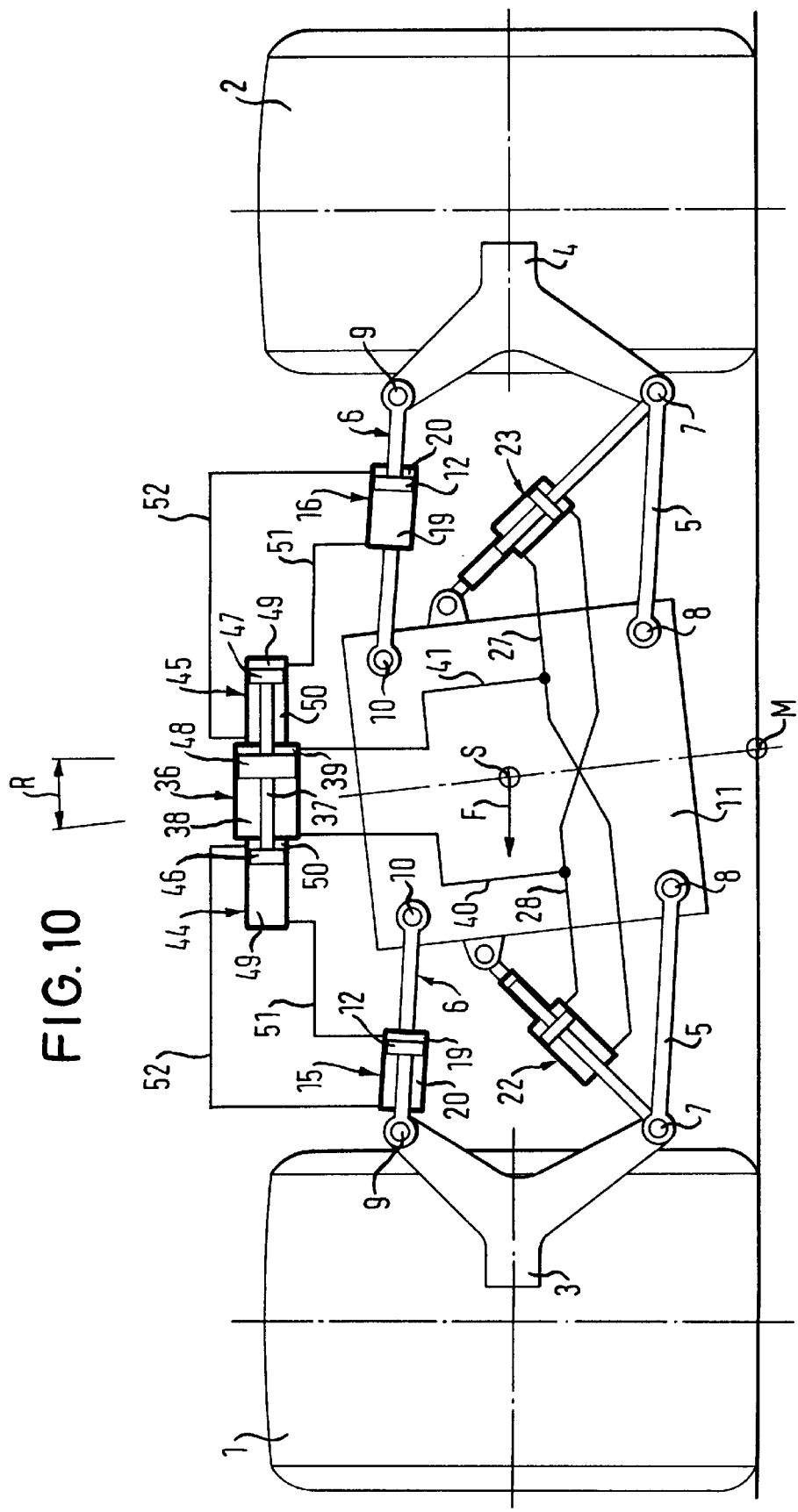
FIG. 10 shows the embodiment of FIG. 9 in a driving situation in accordance with FIG. 2.

FIGS. 9 and 10 show a combination derived from the embodiments of FIGS. 1, 2 and 5, 6, 7. Here for example, the servo cylinders 15 and 16 of FIGS. 1 and 2 are provided as adjustment devices although they are not operated directly by the master cylinders 22, 23 but via transfer cylinders 44, 45.

The pistons 46, 47 in the transfer cylinders 44, 45 are coupled to the piston 48 in the servo cylinder 36 via a common piston rod 37.

The transfer cylinders 44, 45 are preferably integral components of the servo cylinder 36. The chambers 19, 20 of the servo cylinder are connected to the chambers 49, 50 of the transfer cylinders 44, 45 by means of fluid lines 51, 52.

The hydraulic transfer ratio can be set by appropriate dimensioning of the piston surface area ratio A1/A2 of the servo cylinders 15, 16 relative to the surface areas C1/C2 of the pistons in the transfer cylinders 44, 45, whereby the condition "A1/A2=C1/C2" must be fulfilled.

Figure 11:
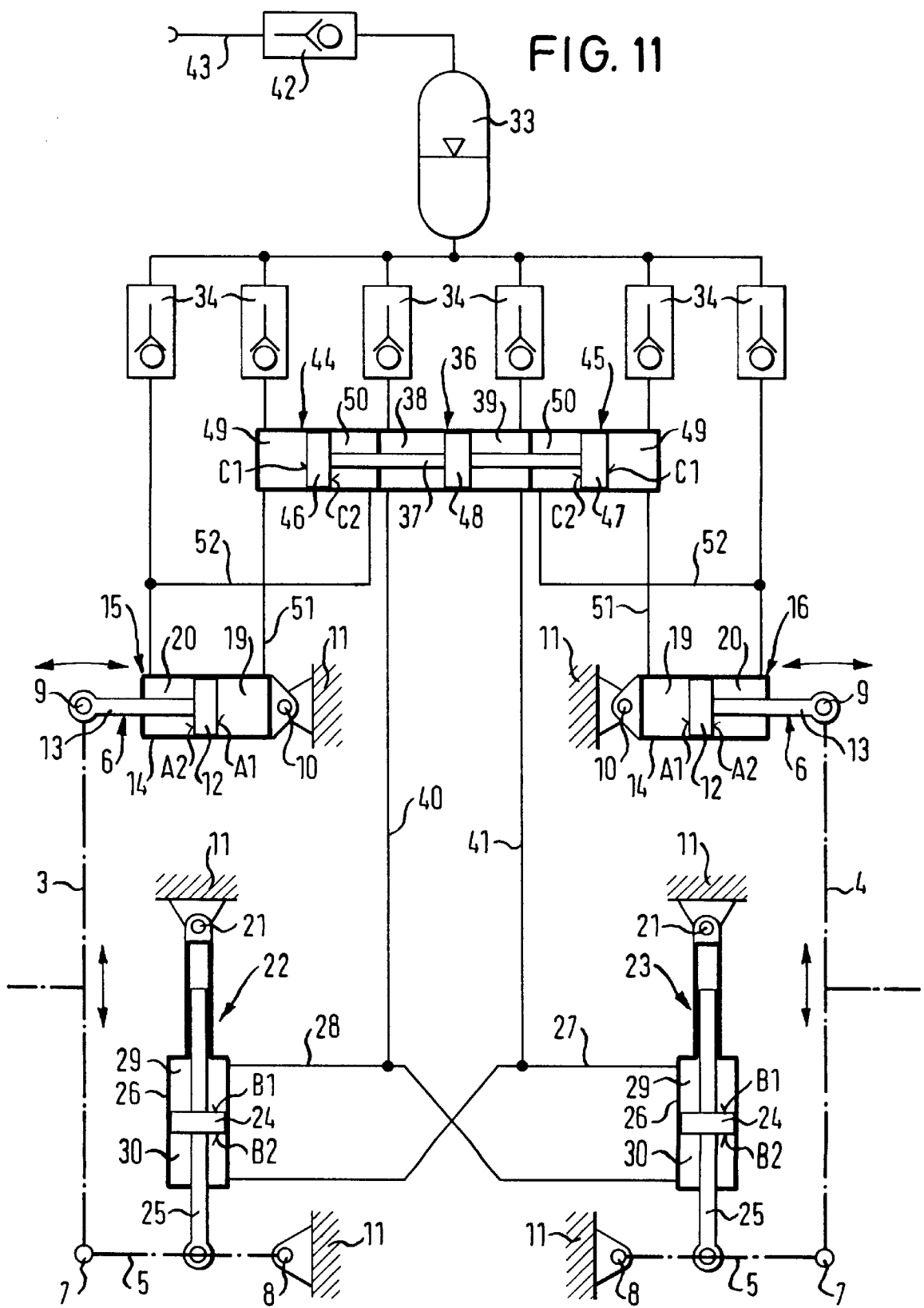
FIG. 11 is a schematic connection diagram of the hydraulic system in the control device in accordance with the invention shown in FIGS. 9 and 10.

The preferably hydraulic arrangement provided in accordance with the invention in FIGS. 9 and 10 is reproduced in FIG. 11 in the form of a schematic connection diagram. Similar parts are provided with the same references.

The invention is not restricted to the examples described and illustrated in the drawings. Further embodiments ensue from the features in the claims and combinations thereof.

What is claimed is:

1. Independent suspension system for vehicles including a chassis and opposite wheels linked thereto by wheel suspension means, wherein the wheel suspension means of each wheel which oscillate during travelling operation comprise links connecting a wheel upright with the chassis and the wheel upright mounts the wheel rotatably around a wheel axis, wherein actuating means are provided between the chassis and a wheel suspension means, the actuating means comprising a camber cylinder having a piston/cylinder arrangement, and wherein a roll cylinder having a second piston/cylinder arrangement is provided acting between the chassis and an oscillating wheel suspension means, the roll cylinder is linked directly or indirectly to an articulation point on said oscillating wheel suspension means and to an articulation point at the chassis wherein a relative movement takes place between the articulation points during a roll movement of the chassis, the roll cylinder is double-acting and comprises two cylinder chambers mutually sealed by a piston, cylinder chambers of each roll cylinder of the wheel suspensions of the opposite wheels are coupled together in such a manner that the cylinder chambers decreasing during a roll movement of the chassis each communicate with a respective cylinder chamber increasing during the roll movement, and the cylinder chambers of the roll cylinders of the wheel suspensions of the opposite wheels are operatively coupled to the cylinder chambers of the likewise double-acting camber cylinder of the same wheel suspension in such a manner that the wheel camber is adjusted in order to increase a cornering force to which purpose the cylinder chambers of the roll cylinder which decrease during a roll movement of the chassis are coupled with the cylinder chambers of the camber cylinder which is increased and which causes a camber-adjusting impulse wherein the total volume of the respectively coupled cylinder chambers is constant.

2. Independent suspension system according to claim 1 wherein a common camber cylinder is provided for both opposite wheels, the camber cylinder being operatively coupled to the chassis and the respective wheel suspension means, and the cylinder chambers of the camber cylinder each being coupled to one of the communicating cylinder chambers of the roll cylinders.

3. Independent suspension system in accordance with claim 1 wherein
   a separate camber cylinder is provided for each of the opposite wheels, the camber cylinder being operatively coupled to the chassis and to the respective wheel suspension means,
   the decreasing cylinder chamber and the increasing cylinder chamber of the respective camber cylinders resulting from a positive adjustment and from a negative adjustment of the camber of wheel uprights associated with the wheels are cross-coupled and said chambers are respectively coupled to one of the communicating cylinder chambers of the roll cylinder.

4. Independent suspension system in accordance with claim 1 wherein the actuating means are effective on upper transverse suspension arms.

5. Independent suspension system in accordance with claim 1, wherein
   the actuating means are an integral component of respective upper transverse suspension arm.

6. Independent suspension system in accordance with claim 1, wherein
   the camber cylinder is hydraulically coupled via third piston/cylinder arrangements to the actuating means which are operatively coupled between the wheel suspension means and the chassis.

7. Independent suspension system in accordance with claim 1 wherein the piston rods of the camber cylinder on a chassis side are effective for wheel camber adjusting purposes on the wheel suspension means via one of lever arrangements and coupling rods.

8. Independent suspension system in accordance with claim 1 wherein a plurality of hydraulic components are combined in a block.

9. Independent suspension system in accordance with claim 1, wherein the two roll cylinders for registering the relative movement each have the same size piston area on respective sides of the piston.

10. Independent suspension system in accordance with claim 1, wherein respective camber cylinders effecting the adjustment of the wheel camber are arranged on each side between the wheel suspension means and the chassis and have different size piston areas on respective sides of the piston.

11. Independent suspension system in accordance with claim 1 wherein the whole hydraulic system is operated at an enhanced base pressure.

12. Independent suspension system in accordance with claim 1 wherein auxiliary actuating means are operatively coupled to the roll cylinders and acting on the track rods.

13. Independent suspension system in accordance with claim 1, wherein
   the actuating means are effective on the respective wheel upright.

* * * * *